United States Patent [11] 3,611,096

| [72] | Inventors | Koichi Sadashige, Berlin, N.J.; Masaru Horii, Kyoto-fu, Japan |
|---|---|---|
| [21] | Appl. No. | 887,506 |
| [22] | Filed | Dec. 23, 1969 |
| [45] | Patented | Oct. 5, 1971 |
| [73] | Assignee | RCA Corporation, New York, N.Y. |
| [32] | Priority | Mar. 21, 1969 |
| [33] | | Great Britain |
| [31] | | 14946/69 |

[54] SERVOSYSTEM FOR RECORDER-REPRODUCER APPARATUS UTILIZING FREQUENCY AND PHASE SYNCHRONIZING
9 Claims, 2 Drawing Figs.

[52] U.S. Cl. .................................................. 318/314, 318/318, 318/327, 318/341
[51] Int. Cl. ........................................................ H02p 5/32, H02p 5/34
[50] Field of Search........................................... 318/314, 318, 327, 341

[56] References Cited
UNITED STATES PATENTS

| 2,803,792 | 8/1957 | Turner | 318/314 X |
| 3,097,267 | 7/1963 | Clark et al. | 318/314 X |
| 3,174,090 | 3/1965 | Hall | 318/318 X |
| 3,187,092 | 6/1965 | Shashova et al. | 318/314 X |
| 3,356,921 | 12/1967 | Bradford et al. | 318/341 X |
| 3,374,413 | 3/1968 | Dornberger et al. | 318/341 |

*Primary Examiner*—Gene Z. Rubinson
*Attorney*—Edward J. Norton

ABSTRACT: A servosystem for synchronizing the rotary operation of a motor to a reference signal. The system provides continuous positive controlled drive for both acceleration and deceleration to effect performance corrections in minimal time. Means are provided for generating a group of polyphase signals phase correlated to a command reference input. The polyphase signals are pulse width controlled and switched in accordance with an error signal, to provide continuous magnitude and sense drive control of the motor.

INVENTORS
KOICHI SADASHIGE and
MASARU HORII.
BY James B. Hayes
ATTORNEY

SERVOSYSTEM FOR RECORDER-REPRODUCER APPARATUS UTILIZING FREQUENCY AND PHASE SYNCHRONIZING

This invention relates to velocity and phase control servo systems. The apparatus is particularly, although not exclusively, adapted for use in controlling the headwheel of a recorder-reproducer system.

In prior art recorder-reproducers, two systems are most commonly used to control the speed and phase of a headwheel motor. One system accomplishes headwheel control by frequency and/or phase modulation scheme. In this system, the headwheel motor is run at a synchronous speed and is usually a conventional 3-phase-type hystersis synchronous motor. The frequency and/or phase modulation system uses an oscillator at a specific center frequency, for example, 240 cycles. The frequency of the oscillator is modulated about this center frequency, and the oscillator exhibits frequency changes which can be used to vary the speed of the motor. This is so because the output of the oscillator is usually coupled to two or three power amplifiers each of which drives one of the phases of the motor.

One of the disadvantages associated with frequency modulated and/or phase modulated systems is that the 3-phase synchronous motor requires full power at all times even under optimum running conditions of proper velocity and phase. Because of the high power requirements, the motor runs hot and the consequent increases in temperature cause disruptive changes in the headwheel assembly which is usually situated in the same vicinity as the headwheel motor. Such temperature effects cause geometric distortions of the recorded waveforms and are detrimental to proper recording and reproducing. A further disadvantage is that the motor used is usually a hystersis-type motor and such motors are very susceptible to hunting. Typically these motors hunt at a frequency, which is determined by the moment of inertia and the damping coefficient of the rotating systems and generally it falls in the range of several cycles per second. This hunting is generally controlled by the use of a servo loop compensating for the phenomenon. The gain and phase characteristics of such a loop are critical and have to be carefully adjusted. If the gain and phase is not set at proper levels, the loop becomes unstable and will cause the motor to become wobbly.

To avoid the difficulties experienced with the above described FM system, an amplitude- or power-modulated system may be used. In such a system, the motor is caused to run in a slip or induction mode. During this mode of operation just enough power is supplied to the motor to allow the motor to overcome friction and windage and maintain desired velocity and phase. Hence the power supplied is just enough for the motor to perform its function properly and drive the headwheel assembly at the required speed and phase. Due to this operation, there is slight heating of the motor and therefore thermal effects described in conjunction with the FM system are greatly reduced.

Because of the large slip factor at which the motor is run in such systems, there is no tendency for the motor to operate eccentrically due to electrical causes.

In spite of these improvements offered the servo control of the velocity and phase of the headwheel is unidirectional. That is, when it is desired to accelerate the headwheel, the power input to the headwheel motor is increased over the steady state condition. However, when it is necessary to decelerate the headwheel, the power input to the motor is reduced or completely removed. Thus the degree of deceleration depends upon the amount of the external friction, air windage and other forms of the loss elements coupled into the drive motor.

It is therefore an object of the present invention to provide improved power servo control of the velocity and phase of a rotating member wherein said control is bidirectional.

In accordance with one embodiment of the present invention, a recorder-reproducer system includes a member rotating in a given direction and means for providing a control signal indicative of the velocity and phase of the member. Means responsive to the control signal and a suitable reference signal are provided for producing an error signal indicative of the phase and frequency difference therebetween. Power sensitive drive means rotate the member. Power control means are coupled to the drive means and are responsive to the error signal to cause the drive means to rotate the member at a velocity and phase so as to reduce the difference. Means are coupled to the power control means for reversing the sense of the power applied to the drive means when the error signal from the velocity and/or phase detector indicates that the motor is in the overspeeded, or phase-advanced state despite the fact that the effective power input is reduced to zero.

Figure 1:
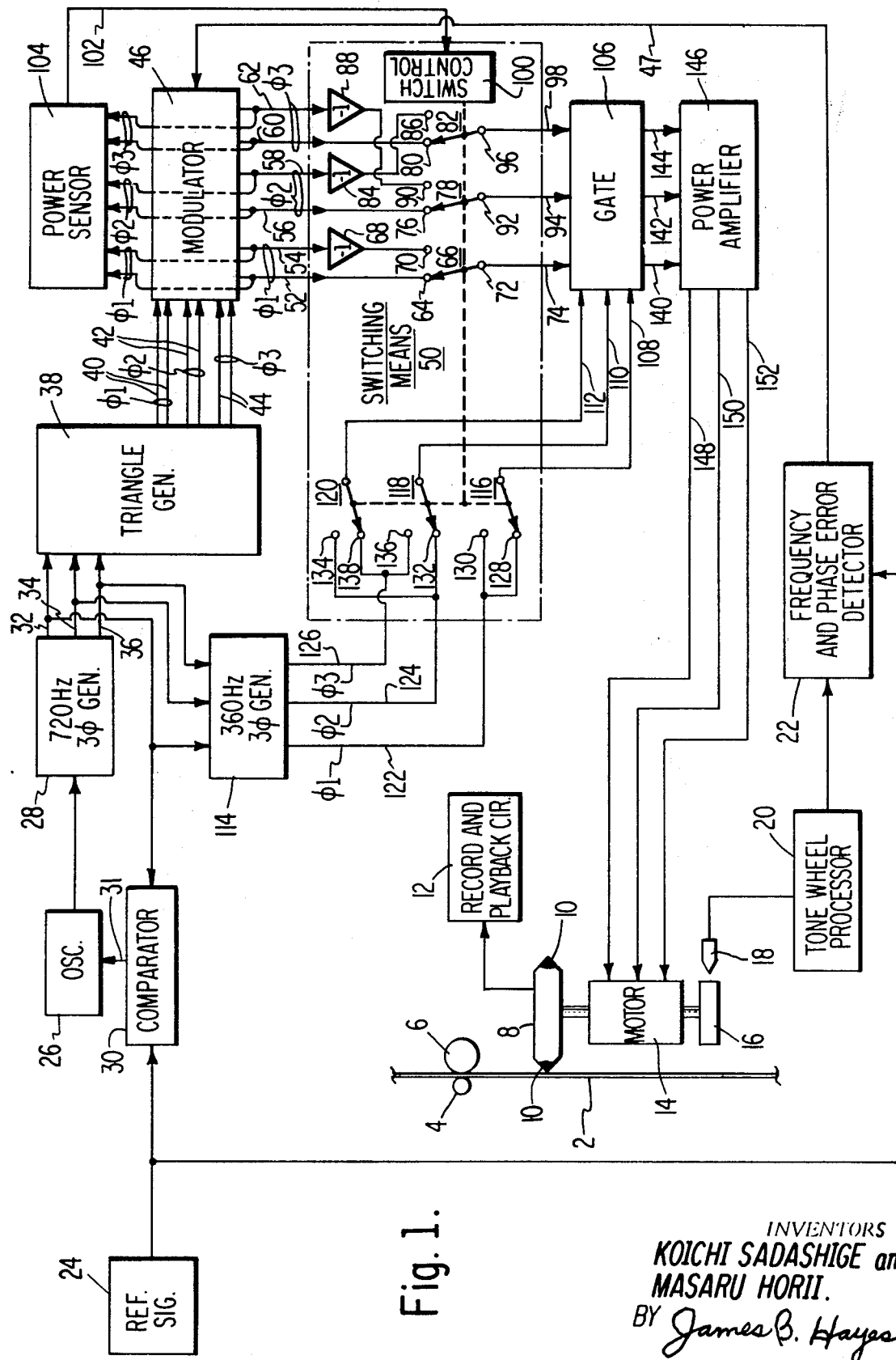
FIG. 1 is a diagrammatic view in block form of an embodiment of the invention.

In FIG. 1 there is shown in simplified form a recorder-reproducer system embodying the invention. In FIG. 1 a record medium 2 is driven by the cooperative arrangement of a capstan 4 and a pinch roller 6. The record medium 2 may be arranged in an endless loop or suitable supply and takeup reels (not shown) may be provided. A headwheel 8 is provided and mounted for rotation in a plane perpendicular to the direction of movement of the medium 2. The headwheel 8 preferably has magnetic heads 10 spaced about the periphery thereof. The magnetic heads 10 engage the record medium 2 in turn, thereby scanning in time sequence across the width of the medium 2. The signals recorded and reproduced from the medium 2 by the heads 10 are processed by the record and playback circuitry 12.

A motor 14 is coupled to the headwheel 8 for providing controlled rotation thereof. The motor 14 is preferably of the polyphase synchronous type which is operable, in response to a controlled energizing power, at a velocity substantially reduced from its design synchronous speed. As already noted this large slip factor minimizes the tendency of the motor to operate eccentrically.

The headwheel drive motor 14 also causes a tonewheel 16 to rotate with the headwheel 8. The tonewheel 16 may be constructed of magnetically susceptible material with a notch or aperture therein. Each time the notch passes a pickup device 18, a pulse is generated. In this or a similar manner, a train of pulses is generated in accordance with the rotational velocity of the headwheel 8. The output of the pickup 18 is provided proper shaping and amplification by circuitry of the tonewheel processor 20.

The output of the tonewheel processor 20 provides a first input to frequency and phase error detection circuitry 22. A reference signal source 24 provides a second input to the error detector 22. The reference signal is preferably a pulse train representative of the velocity and phase to which the operation of motor 14 and hence headwheel 8 are to be synchronized. Where the information being processed by the recorder reproducer system is a television-type video signal, the reference signal is preferably derived and correlated with the phase and frequency of the horizontal and or vertical synchronizing signals of the video information.

For present purposes, the frequency of the reference signal is made to be 240 Hz. which will produce a desired synchronized running speed for the headwheel of 240 revolutions per second.

Figure 2:
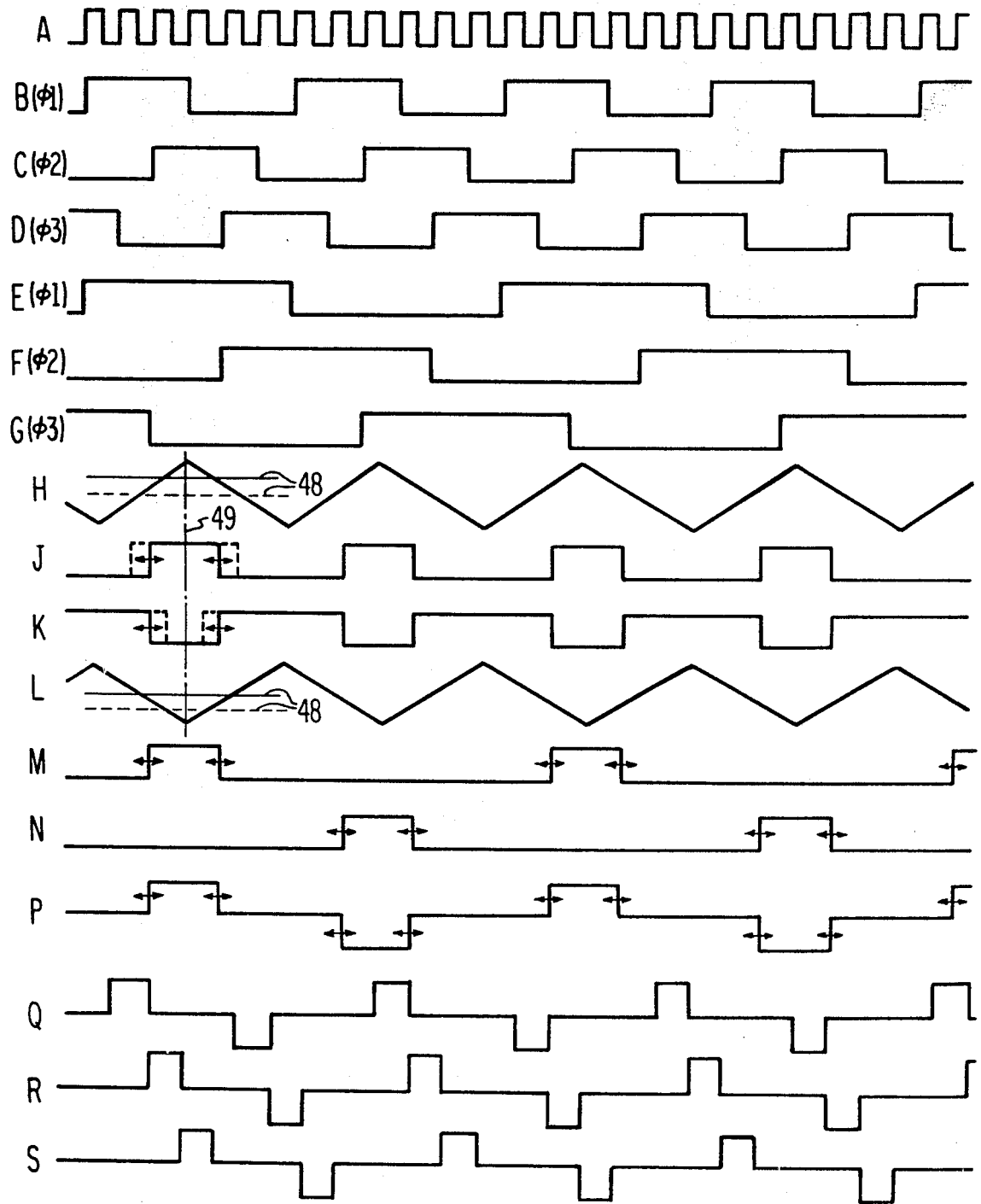
FIG. 2 is a series of waveforms helpful in understanding the operation of embodiment of FIG. 1.

The reference signal from source 24 is also provided as an input to a signal-generating arrangement comprised of an oscillator 26, generator 28 and a comparator 30. The oscillator 26 in response to the control input on lead 31 produces a signal which is a multiple of the reference signal. For present purposes the multiple is made to be the 18th multiple or 4320 Hz. The generator 28 in response to this signal produces three time-phased outputs which will be herein referred to as phase one ($\Phi1$), phase two ($\Phi2$) and phase three ($\Phi3$). The three outputs are preferably at a second given multiple of the reference signal such as 720 Hz. and they are phased at 120° phase intervals among them. One of the generator 28 outputs, here Φ1, is fed as a second input to the comparator 30. The comparator 30 is operable to provide a control signal on lead 31 which assures that the generator 28 outputs are correctly frequency and phased correlated with the reference signal from the source 24. The relative phasing of the outputs of the generator 28 and the oscillator 26 output are shown in FIG. 2 by the waveforms B, C, D and A respectively.

Thus the outputs of the generator 28 are phase correlated with the reference signal, which itself in known manner is phase correlated to the horizontal and vertical sync of the video information processed by the recorder-reproducer. This assures that any interference if and when occurring, which most commonly is at the horizontal rate, will remain stationary and hence be less offensive upon displaying the video information.

The outputs of the generator 28 on leads 32, 34 and 36 are coupled to the input of triangle waveform generator 38. The generator 38 includes one of the known type of signal-integrating means. The triangle generator 38 is operable to produce from the outputs of generator 28, a series of triangular waveforms one of which is shown for Φ1 as waveform H of FIG. 2. In practice of the invention the generator 38 also includes circuitry such as a signal inverter, for providing an inverted form or complement of the waveform H of FIG. 2. Thus the generator 38 provides a pair of complementary triangle waveforms for each of phases Φ1, Φ2, and Φ3 as outputs 40, 42, and 44 respectively. The triangle waveforms for one of the phases if shown as waveforms H and L of FIG. 2.

The outputs 40, 42 and 44 are fed as inputs to the modulator 46. The modulator 46 includes clipping circuits whose clipping level (level 48 of waveform H and L in FIG. 2) is controlled in accordance with the velocity and phase error signal output of the detector 22 on lead 47. As seen from a consideration of waveforms H and L of FIG. 2, the operation of the clipping circuits of modulator 46, is to provide a symmetrical pulse width varied signal (waveforms J & K of FIG. 2) in accordance with the error output of detector 22. While the pulse width of the waveform J is variable, the pulse amplitude is rendered constant by signal level control circuitry of known type, which is also included in the modulator 46. For clarity, only waveforms J and K of FIG. 2 for one example phase are shown.

It is to be noted that as indicated by the dashed line levels 48 of FIG. 2, that as the clipping level 48 is varied the pulse widths of waveforms J and K vary inversely. The reason for this will become apparent from the discussion hereinafter presented.

It is also to be noted that the pulse width variation is symmetrical about the indicated centerline 49 of the waveform J and K of FIG. 2. This symmetrical pulse width variation modulates the motor 14 drive as hereinafter explained. Providing this symmetry offers the advantage of not producing undesirable phase shifts of the drive motor shaft. In the absence of symmetrical width variation the motor shaft rotates at a desired velocity determined by the pulse width, but asymmetrical width variation would cause a point of reference on the shaft to be advanced or retarded in phase as the output of the error detector 22 varies. This in turn would cause the transducers 10, although rotating at a desired velocity, to scan the medium 2 in an undesirable alter timed relationship.

The variable pulse width signals, shown by way of example in FIG. 2 as waveforms J and K for one of the phases, are coupled to a switching means 50 on leads 52 and 54 respectively. Variable pulse width signal pairs, for Φ2 and Φ3 are also coupled to switching means 50 on leads 56, 58 and 60 and 62 respectively. One signal member of the Φ1 pair on lead 52 is coupled to contact 64 of a switch 66. The other signal member of the Φ1 pair on lead 54 is coupled through an inverting means 68 to contact 70 of switch 66. The pole 72 of switch 66 is coupled to provide a first selected output on lead 74 from the switching means 50. One member of the Φ2 signal pair on lead 56, is coupled to a first contact 76 of the switch 78. One member of the Φ3 pair on lead 60 is coupled to a first contact 80 of switch 82. The other member of the Φ2 signal pair on lead 58 is coupled through an inverting means 84 to a second contact 86 of the switch 82. The other member of the Φ3 signal pair on lead 62 is coupled through an inverting means 88 to a second contact 90 of the switch 78. The pole 92 of switch 78 is coupled to provide a selected output on lead 94 from the switch means 50. The pole 96 of switch 82 is coupled to provide a selected output on lead 98 from the switching means 50. A switch control means 100 is also included for simultaneously controlling signal selection by the switches 66, 78 and 82 in response to a control signal on lead 102. It is to be noted that switch 66 is operable to provide as an output on lead 74 a selected one of the Φ1 variable pulse width signals. The switch 78 in the position as shown provides a first of the Φ2 signals (such as waveform J of FIG. 2) but when in contact position 90 an inverted form of the second signal of Φ3 (waveform K of FIG. 2) is present on lead 94. The switch 82 in the position as shown provides a first of the Φ3 signals (such as waveform J OF FIG. 2) but when in contact position 86, an inverted form of the second signal of Φ2 (waveform K of FIG. 2) is present on lead 98. Thus the switching means 50 is operable to select between the first and second members of the variable pulse width signal pairs for the various phases, and also to transpose the output of two of the phases, shown as Φ2 and Φ3.

The control signal on lead 102 for switching means 50 is provided from a power sensor means 104. The power sensor means 104 has as inputs, the variable pulse width signal pairs for each of the phases present on leads 52 through 62. Pulse-width-sensitive circuitry within the sensor 104 is operative to detect when the pulse width of the inputs, which is indicative of the power ultimately to be utilized to drive the motor 14, is less than a given value. The sensor 104 provides the control signal on lead 102 to indicate when the pulse width and hence the power drive is greater and less than the given value.

A pulse width value which is 33⅓ percent of the maximum pulse width provided by the modulator 46 is of particular significance and is made the given reference value for the sensor 104. The significance of this value is understood when the energization of the polyphase motor 14 is considered. In order for the motor 14 to produce drive there must be a continuity between any pair of its three windings Φ1, Φ2, Φ3. Such a condition is shown in FIG. 2 by the overlapping character of the waveform B, C and D for the three phases. When the pulse width of the signals is reduced to approximately one third of maximum value the variable pulse phase signals are shown in waveforms Q, R and S of FIG. 2. It is noted that among the waveforms Q, R and S, there is no overlapping and therefore no continuity between any two phases. Thus although there is a finite pulse width, the effective power to the motor is zero. The nonoverlapping or zero power pulse width condition therefore may be detected for example by providing in sensor 104 logic ANDING means responsive to the variable pulse width inputs, which set a flip-flop circuit in accordance with the value of the pulse width in relation to the zero power pulse width.

The outputs from switching means 50 on leads 74, 94 and 98 are coupled as a first input to a logic gate means 106. A second group of inputs on leads 108, 110, and 112 to the gate means 106 is provided from a generator 114 through switches 116, 118 and 120 respectively. The generator 114 is provided three phase inputs on leads 32, 34 and 36 from the generator 28. In response to these inputs the generator 28 provides three phase outputs at a second given multiple of the signal from reference signal source 24. Since the inputs to generator 114 are provided from generator 28, the outputs of the generator 114 are also phase correlated with the reference signal of source 24. For present purposes the multiple produced by the generator 114 is the third and therefore the three outputs on leads 122, 124, 126 are at a frequency of 360 Hz. These outputs are as shown by waveforms E, F, and G of FIG. 2, in respect to the reference signal A and generator 28 output waveforms B, C and D. The Φ1 signal on lead 122 is fed to contacts 128 and 130 of switch 116. The output 124 is fed to contact 132 of switch 118 and to contact 134 of switch 120. The output 126 is fed to contact 136 of switch 118 and contact 138 of switch 120.

It is to be noted that while switch 116 provides Φ1 signals in both contact position, switches 118 and 120 are controllably operable to transport Φ2 and Φ3 signals. Switches 116, 118 and 120 may be, as shown, part of the switching means 50 or provided separately. In either event switch 116, 118 and 120 are controlled simultaneously with switches 66, 78 and 82 by means of switch control 100.

The gate means 106 includes known logic circuitry such as NAND or NOR circuits which provide variable width gating of outputs of the generator 114 to produce 360 Hz. three-phase outputs on leads 140, 142 and 144. The outputs contain the pulse width variation error information of the detector 22 through the operation of the modulator 46. The operation of the gate means 106 will be understood from a consideration of one of the phases, namely Φ1, from the waveforms of FIG. 2. Portions of the waveform E are gated out in accordance with the variable width signal J to produce waveform M. Waveform N is produced by gating of the compliment of waveform E by waveform J. The waveforms M and N are combined to produce the bipolar variable pulse width waveform P which is present on lead 140 from the gate 106. The Φ2 and Φ3 signals are processed similarly to provide bipolar outputs on leads 142, 144. The three phase outputs on leads 140, 142 and 144 are fed through a power amplifier 146 to respective three phase inputs of motor 14 on leads 148, 150 and 152. The output level of the power amplifier 146 may be adjusted, as already discussed to provide a steady state velocity of the motor 14 which is less than its normal synchronous speed.

In summary the operation of the system of FIG. 1 will be understood from the following discussion for the underspeed and overspeed conditions of the motor 14. In the underspeed condition, which may be due to electrical or other disturbance, the detector 22 provides a signal indicative of the error between the reference 24 and the output of the tonewheel processor 20. At the same time the triangle generator 38 produces inputs to modulator 46 from the reference 24 output through generator 28. The error input to modulator 46 is operable to shift the clipping level so as to widen the three phase pulse outputs of modulator 46. The sensor 104 detecting the pulse width as being greater than the 33 percent i.e. or zero power value, outputs a signal to switch control 100 which holds the switching means 50 in the contact position shown. The increased width 720 Hz. pulses for the three-phases output of the switching means 50, through the operation of the gate means 106, provide 360 Hz. bipolar pulses with increased width through amplifier 146 to the motor 14. The increases or modulated width of the drive to motor 14 causes the motor to increase in velocity.

For the overspeed condition, the inputs to modulator 46 are developed in the manner just described. The error input to modulator 46 now causes a reduction in pulse width of the modulator 46 outputs. This reduced pulse width is, as before, coupled through the operation of gate 106 and amplifier 146 to motor 14. The motor in response begins to decelerate. When the pulse width from modulator 46 reaches the 33⅓ percent width value, no power is provided to motor 14. If this were the only control provided, as pointed out above, the motor 14 would continue to coast at an undesirable overspeed. Eventually friction and windage would bring the motor to the desired velocity.

In the arrangement of FIG. 1, when the zero power condition is reached, the sensor 104 causes switch control 100 to place each of the poles of switches 66, 78, 82, 116, 118 and 120 to contact the contacts 70, 90, 86, 130, 136 and 134 respectively. In this condition, the K-waveform (FIG. 2) outputs of the modulator 46 rather than the J-waveform outputs are fed to gate means 106. In addition, the Φ2 and Φ3 outputs are transposed between leads 94 and 98.

The transposition of the two phases causes the drive control signal applied to the motor 14 to produce a drive, having sense or effective polarity which is opposite the direction the motor is rotating. The clipping level in response to the error signal, which continues to indicate the overspeed condition, produces increasing pulse width drive until the motor 14 is slowed to the desired reference velocity.

The increased pulse width is provided through the described arrangement of clipping in modulator 46. That is, for an overspeed error signal (as seen in FIG. 2), the J-waveform decreases but the K-output width increases. It is preferable, to make the operation of the modulator 46 such that equal widths are produced at the 33 percent pulse width of the J-output. This assures switching when zero power is being applied to the motor. It also provides a smooth continuous drive control without energizing value jumps which may disturb the motor.

Therefore a servo system has been provided with positively controlled deceleration. In addition the symmetrical variation of the pulse control drive preserves the desired phasing of the motor 14 shaft and hence proper phasing of the scanning of the transducers 10 over the medium 2.

What is claimed is:

1. In a recorder-reproducer system having a member rotatable in a given direction including means for providing a control signal whose frequency and phase are indicative of the velocity and phase of said rotatable member, an arrangement for synchronizing the operation of said rotatable member with a reference signal, comprising: means responsive to said control signal and said reference signal for providing an error signal indicative of the frequency and phase difference therebetween; power sensitive drive means for rotating said member; power control means coupled to said drive means and responsive to said error signal to cause said drive means to rotate said member in a given direction at a velocity and phase so as to reduce said difference; and means coupled to said power control means and active upon said power being reduced to a given value in response to said error signal, to apply power to said drive means in a manner establishing a rotation-urging force in said drive means, said force acting in a direction opposite said given direction causing the magnitude of the velocity of said member in said given direction to be reduced in accordance with said error signal.

2. The invention according to claim 1; wherein said power-sensitive drive means is a plural phase motor having at least first and second inputs, said power control means includes means for generating and applying sequentially phased substantially constant level pulse energizing signals to the respective inputs of said drive means, said control means further including means for varying the width of said energizing signals in accordance with said error signal, means for comparing the value of the width of said energizing signals with a predetermined value, and means for transposing two of said energizing signal inputs to said drive means upon said width of said energizing signals being less than said predetermined value.

3. The invention according to claim 2, wherein; said level of energizing signals applied to said drive means is limited by said control means to a value which causes said drive means to rotate at a speed which is substantially less than the synchronous speed of said drive means, and said control means includes means for symmetrically varying the duty cycle of each of said energizing signals so as to maintain a given timed phased relation among said energizing signals.

4. In a headwheel servo system including means for providing a control signal indicative of the phase and frequency of said rotating headwheel, and detecting means responsive to said control signal and a reference signal for providing an error signal indicative of the difference therebetween, the combination comprising:

signal-generating means coupled to said detecting means and responsive to said reference signal for providing a plurality of pairs of pulse signal outputs;

said generating means including means for establishing a given phasing sequence of each of said pair of signals with respect to other of said pairs of signals and said reference signal, and means for symmetrically width modulating said signals in accordance with said error signal;

pulse-width-sensitive means coupled to said generating means for providing a signal indicative of the pulse width condition of said generating means outputs, polyphase energizable motor means for rotating said headwheel;

means including switching means coupled between said signal generating means and said motor means for applying selected ones of said generating means outputs to said motor means; and means for controlling said switching means in response to the output of said pulse-width-sensitive means.

5. The invention according to claim 4, wherein; said switching means is operable in a first mode in which one member of each of said signal pairs is coupled to respective inputs of said motor means, and a second mode in which the other signal member of two or said signal pairs is coupled to a motor input other than the input to which said one member of said pair was applied.

6. The invention according to claim 4 wherein the width-modulating means of said signal-generating means includes means for providing inverse variation of the width of said signal pairs.

7. In combination with a recorder-reproducer system having a rotatable headwheel including signal transducer means, apparatus for synchronizing the rotation of said headwheel with a reference signal of a given frequency and phase, comprising:

means for providing a second signal whose frequency and phase are indicative of the velocity and phase of said headwheel;

third means responsive to said reference signal for providing first and second outputs, said one output comprising a first plurality of pulse trains each having a frequency which is a first given multiple of said reference signal frequency, said other output comprising a second plurality of pulse trains each having a frequency which is a second given multiple of said reference signal, each of said pulse trains being sequentially phased with respect to said reference signal;

detecting means responsive to said second signal and said reference signal for providing an error signal indicative of the frequency and phase difference therebetween;

fifth means coupled to said first output of said third means and responsive to said error signal for providing a plurality of pairs of pulse trains, including means causing the pulse width of the members of each of said pulse train pairs to vary inversely in accordance with variations of said error signal;

pulse-width-monitoring means responsive to the output of said fifth means for providing an output signal indicative of the pulse width of a given member of each of said signal pairs being less than a given width;

switching means having inputs coupled to said second and third means for providing an output comprising selected ones of the output of said fifth means and the second output of said third means;

means coupled to the output of said monitoring means for controlling the selective operation of said switching means;

gating means coupled to the output of said switching means for providing from the second output of said third means an output having pulse widths in accordance with the selected ones of the output of said fifth means; and means responsive to the output of said gating means for controlling the rotation of said headwheel.

8. The invention according to claim 7 wherein said switching means is operable in one mode thereof to transpose two of said plurality of outputs of said fifth means.

9. The invention according to claim 7, wherein; said third means includes means for providing a fixed phase relation between said reference signal and the center of each pulse of said first and second outputs of said third means, and said fifth means includes means for symmetrically varying the pulse widths of the output of said fifth means to provide said output with said fixed phase relation of the output of said third means.